Oct. 27, 1931.　　　　S. E. TAFT　　　　1,829,200
CUTTING TOOL
Filed July 9, 1929
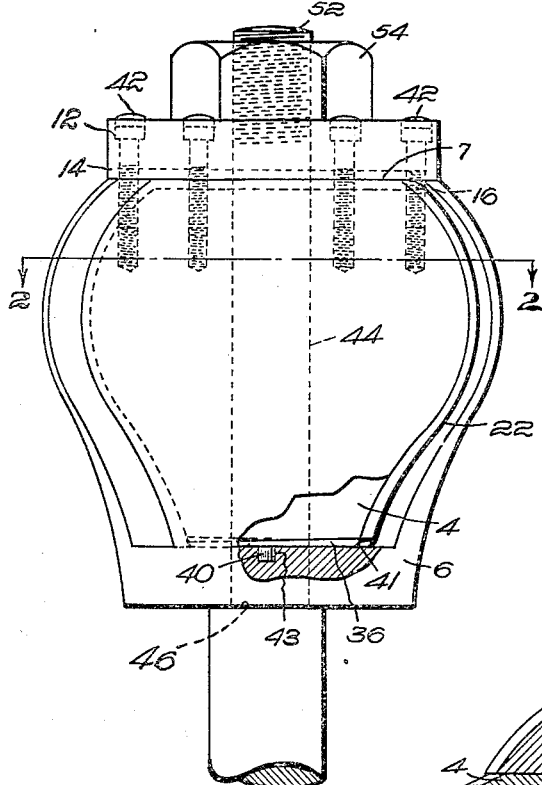
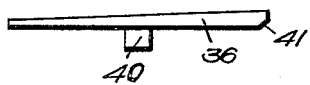
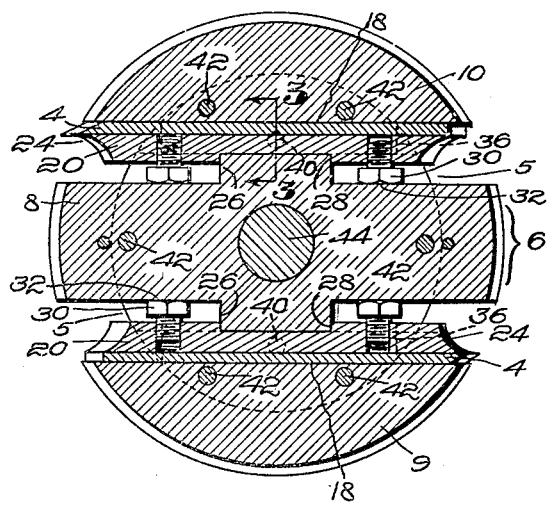
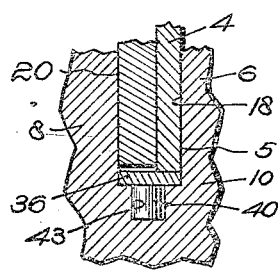
Inventor:
Sydney E. Taft
by Emery, Booth, Varney & Townsend
Attys Patented Oct. 27, 1931

1,829,200

UNITED STATES PATENT OFFICE

SYDNEY E. TAFT, OF FRAMINGHAM, MASSACHUSETTS, ASSIGNOR TO GULLIFORD WOOD HEEL COMPANY, OF LYNN, MASSACHUSETTS, A FIRM COMPOSED OF ARCHIBALD T. GULLIFORD AND PEARCE H. GULLIFORD

CUTTING TOOL

Application filed July 9, 1929. Serial No. 376,914.

This invention aims to provide an improved adjustable cutter for woodworking machinery and in the accompanying drawings I have shown merely for illustrative purposes one embodiment of the invention, wherein Fig. 1 is a side elevation of the cutter;

Fig. 2 is a transverse section on the line 2—2 of Fig. 1;

Fig. 3 is a detail section taken on the line 3—3 of Fig. 2; and

Fig. 4 is a detail side elevation of the cutter blade gauge.

In the drawings I have shown the invention in the form of a rotary cutter that is particularly designed for use in turning wood heels although the invention is not limited to such use.

When used for turning heels the edges of the cutting blades describe approximately S-curves whereby when a heel block is moved into operative relation with the cutter the sides and rear portions of the heel block will gradually assume the desired shape.

The cutter blades 4, only two of which are shown in the drawings, are desirably placed upon opposite sides of the axis of the cutter in recesses 5 arranged tangential to a circle struck from the axis of the cutter and formed in the body of a cutter holder or head 6.

The recesses 5 desirably extend laterally through the cutter holder and longitudinally thereof for the greater portion of its length to the end 7, forming a central portion 8 and side or wing portions 9 and 10.

To prevent the spreading of the wing portions 9 and 10 from the central portion 8 when pressure is applied to secure the cutters in place a cap plate 12 is provided herein with an annular rim 14 which overlies and engages complementary portions 16 formed upon said holder 6.

The cutter blades 4 are arranged one within each recess 5 preferably against the inner surfaces 18 of said wings 10, and are clamped against said surfaces by a combined clamping and stripping plate 20 having approximately the same outline as said cutting blades.

One edge at least of each blade 4 is, as hereinbefore stated, approximately S-shaped as best shown at 22 in Fig. 1, and projects slightly beyond the periphery of the holder 6. The latter being similar in form and only slightly removed from the edge 22, it serves as a guard to prevent workmen from accidentally inserting their fingers far enough between the cutter blades while rotating to sever them. The most that could happen is the shaving off of portions of the flesh of the fingers.

The edge of the clamping plate 20 that is shaped like the cutting edge 22 is chamfered at 24 to serve as a chip breaker for the material removed by the cutter blade from the block. Furthermore, said clamping plate is considerably thicker than the cutter blade and is held against movement within the recess 5 radially of said holder, desirably, by tongue and groove, one of which, herein the tongue 26, is formed upon the central part 9 of the holder 6, the groove 28 being formed in the adjacent face of the clamping plate. The invention, however, is not limited to the specific means for preventing radial movement of said clamping plate.

Pressure is applied to each clamping plate 20, desirably by screws 30 having screw-threaded engagement at one end with said plate and engaging at their other end 32 with the adjacent wall of the portion 8 of said holder against which pressure is exerted by said screws to force the clamping and cutter plates toward the opposite wall of the recess.

The cutter blades 4 are shorter than the recesses 5, measured longitudinally of the axis of the cutter, in order to permit the cutter blade to be tipped to different angles relatively to said axis.

In order accurately to adjust the cutting blades within their respective recesses so that the cutting edges of all blades will properly align and cut equally, said blades are made uniform in size and shape and tapering members or gauges 36 are provided one for insertion beneath each cutter blade and the lower end of its recess. These gauges are of uniform taper and thickness and means are provided for positioning said gauges in the same radial relation to the axis of the cutter. For example, I provide each gauge with a lug 40 projecting downward from the gauge 36 into a hole 43 formed in the lower end of the recess 5. By first placing the gauge in the recess 5 and inserting its lug in the hole 43, then by placing the cutter in its recess, said gauge will be held in place during the operation of the cutter. The gauge 36 is slightly shorter or at least no longer than the recess 5 so as not to project beyond the face of the holder and interfere with the operation of the cutter.

The gauges 36 are preferably equal in thickness to the width of the recess 5 so that there will be no sidewise or swinging movements of said gauges therein.

A different set of gauges will be provided for each type or form of cutter and all of the gauges of each set will be substantially identical in order to insure all cutter blades performing an equal amount of work, and the set of gauges selected will remain in the cutter head during its operation to assist in maintaining the cutter blades in proper positions.

To assist in removing the gauges from the holder the larger ends thereof are cut under at 41 to permit a screw driver or similar tool to be inserted therebeneath and to raise it from its seat.

The plate 12 is shown attached to the holder 6 by screws 42 extending through said plate and into engagement with the portions 9 and 10 of the holder. If desired, however, the screws 42 may be dispensed with and the plate be secured in its position upon the holder merely by the means which secures the cutter to the arbor 44, which herein consists of a nut 54 engaging a screw-threaded portion 52 of the said arbor, and which forces said cutter head against a shoulder 46.

The invention is not limited to the specific form shown.

Claims:

1. A rotary cutter comprising a cutter holder having lateral recesses, a cutter arranged in each recess and movable longitudinally and laterally therein, a series of wedges of uniform angularity one for each recess to tilt said cutters to predetermined angles with respect to the face of said cutter holder, means to position said wedges in uniform positions radially in their respective recesses, including lugs and cooperating recesses in said wedges and cutter holder respectively, and individual clamping means for said cutters.

2. A rotary cutter comprising a cutter blade, a cutter holder comprising a peripheral face substantially conforming with the contour of said cutter blade, means to clamp said cutter in said holder, means to vary the angular relation of the cutting edge of said cutter blade with the peripheral face of said cutter holder, including a wedge shaped member provided with a lug to hold said wedge in a predetermined position relatively to said holder.

3. A rotary cutter comprising cutter blades, a cutter holder having lateral recesses to receive said cutter blades, means to position said blades in said recesses with their cutting edges arranged at predetermined angles with respect to said holders, said means including tapered members arranged between said cutter blades and said holder, means to position said tapered members in uniform relation with respect to said holder including cooperating lug and recess in said tapered member and holder, and means to clamp said cutter blades in said holder.

4. A cutter comprising a holder, a plurality of adjustable cutter blades, tapered elements arranged beneath said blades to incline the same to selected angles, means to secure said blades in adjusted positions, and means to position said blade longitudinally including a lug arranged to fit a recess formed in said holder.

5. A cutter comprising a plurality of adjustable cutter blades, a holder, removable elements for inclining said cutter blades at selected angles in said holder, and means to position said removable elements longitudinally, including cooperating lug and recess members on said holder and removable elements respectively.

In testimony whereof, I have signed my name to this specification.

SYDNEY E. TAFT.